United States Patent
Larson et al.

(10) Patent No.: US 6,865,504 B2
(45) Date of Patent: Mar. 8, 2005

(54) APPARATUS AND METHOD FOR A RECONFIGURABLE POD INTERFACE FOR USE WITH AN EMULATOR UNIT

(75) Inventors: Lee A. Larson, Katy, TX (US); Gary L. Swoboda, Sugar Land, TX (US); Roland R. Hoar, Missouri City, TX (US); Douglas E. Deao, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/212,621

(22) Filed: Aug. 5, 2002

(65) Prior Publication Data

US 2004/0024558 A1 Feb. 5, 2004

(51) Int. Cl.[7] .............................................. G01M 19/00
(52) U.S. Cl. ....................................................... 702/123
(58) Field of Search ................................ 702/117, 119, 702/122, 123, 125; 703/13–15, 23, 26, 27; 714/28–30

(56) References Cited

U.S. PATENT DOCUMENTS 5,640,337 A * 6/1997 Huang et al. ................. 703/23

2004/0001432 A1 * 1/2004 Wescott ...................... 370/217

* cited by examiner

Primary Examiner—Michael Nghiem
(74) Attorney, Agent, or Firm—William W. Holloway; W. James Brady; Frederick J. Telecky, Jr.

(57) ABSTRACT

A reconfigurable cable/pod unit replaces the cable/pod unit coupling an emulation unit and a target processor. The reconfigurable cable/pod unit includes the discrete logic elements, a programmable unit and interface logic. The programmable unit and the interface unit permit the pod unit to assign conductors to the coupled cable. The interface unit includes storage and other logic elements that compensate for the differences in clock speeds and in rates of data exchange between the emulation unit and the target processor. No changes are necessary in the emulation unit to use the reconfigurable cable/pod unit. The reconfigurable cable pod unit permits, by changing the programming in the programmable unit, to operate in selectable modes, to provide a selectable interface to the target processor, to implement changes and upgrades in the testing procedures, and to test different types of target processors.

17 Claims, 2 Drawing Sheets

APPARATUS AND METHOD FOR A RECONFIGURABLE POD INTERFACE FOR USE WITH AN EMULATOR UNIT

BACKGROUND OF THE INVENTION

1. Field of the Invention

This invention relates generally to the testing of digital signal processing units and, more particularly, to exchange of data between digital signal processing unit under test and the emulation unit receiving the test signals. The cable connecting the digital signal processing unit and the emulation unit includes a pod for providing an interface between the two devices.

2. Background of the Invention

Referring to FIG. 1, a test configuration, according to the prior art, is shown. The configuration includes an emulation unit 10, a cable/pod unit 15, and a target processor 5. The emulation unit 10 includes a field programmable gate array 101 and a test bed controller 102. The cable/pod unit 15 includes a cable portion 152 with a 19-pin connector for coupling pod 151 to the emulation unit 10. The cable/pod unit 15 includes a cable portion 153 with a 14-pin connector for coupling the pod 151 to the target processor.

The operation of the test configuration can be understood as follows. The JTAG (Joint Test Action Group) instructions are applied from the test bed controller 102 to the field programmable gate array 101. The JTAG instructions (on five conductors) along with associated emulation control and timing instructions are then forwarded to the pod 15. The pod is comprised of discrete logic elements and forwards the JTAG instructions to the target processor 5. In the target processor, the JTAG instructions are executed and the resulting test data transmitted from the target processor 5 to the pod 15 and to the field programmable gate array 101 for appropriate distribution in the emulation unit for analysis.

While the test configuration shown in FIG. 1 has proven satisfactory for testing the target processor with JTAG protocols, the ability to use trace data to test and debug a target processor has become increasingly important. However, many users have an emulation unit that is being used to test the target processor with the JTAG protocol. It would be desirable to use as much of the existing test configuration as possible, but be able to respond to changes and upgrades in the testing function.

A need has therefore been felt for apparatus and an associated method having the feature of improving the test capabilities of the test configuration. It would be yet another feature of the apparatus and associated method to improve the test capabilities with minimal change to the emulation unit. It would be still another feature of the apparatus and associated method to provide a reconfigurable cable/pod unit. It would be a more particular feature of the present invention to permit the emulation unit to test a target processor with both JTAG procedures and with trace procedures. It is yet another more particular feature of the apparatus and associated method to provide an expanded pod-to-target cable portion to facilitate trace data information. It is still another feature of the apparatus and associated method to provide a pod that can provide an interface between the trace data generated by the target processor and applied to the emulation unit. It a further object of the apparatus and associated method to provide a cable/pod unit for simultaneously transferring JTAG and trace signals that is compatible with a cable/pod unit for transferring only trace signals and with transferring only JTAG signals.

SUMMARY OF THE INVENTION

The aforementioned and other features are accomplished, according to the present invention, by replacing the existing cable/pod unit with a reconfigurable cable/pod unit that is coupled between an emulation unit and a target processor. The cable/pod unit includes a pod unit, a first cable portion for coupling the pod unit to the emulation unit, and a second cable portion for coupling the pod unit to the target processor. The pod unit includes an interface unit for providing an interface for data exchange between the emulation unit and the target processor. This interface unit compensates for differences in data signal generation and reception between the emulation unit and the target processor. The pod unit also includes a logic unit for providing an interface for selected signals such as control signals and clock signals. The pod unit includes a programmable unit that controls the assignment of functionality of the cable conductors for the two cable portions. The programmable unit permits the pod unit to be reconfigured to provide a controllable interface between the emulation unit and the target processor. This reconfigurability permits updates and new functionality to be added by reprogramming the programmable unit. For example, in a preexisting pod/cable unit exchanging JTAG and related signals between the emulation unit and the target processor, the reconfigurable cable/pod unit permits the exchange of JTAG and related signals, the exchange of trace and related signals, or the simultaneous exchange of JTAG, trace and related signals.

Other features and advantages of present invention will be more clearly understood upon reading of the following description and the accompanying drawings and the claims.

DESCRIPTION OF THE PREFERRED EMBODIMENT

1. Detailed Description of the Figures

Figure 1:
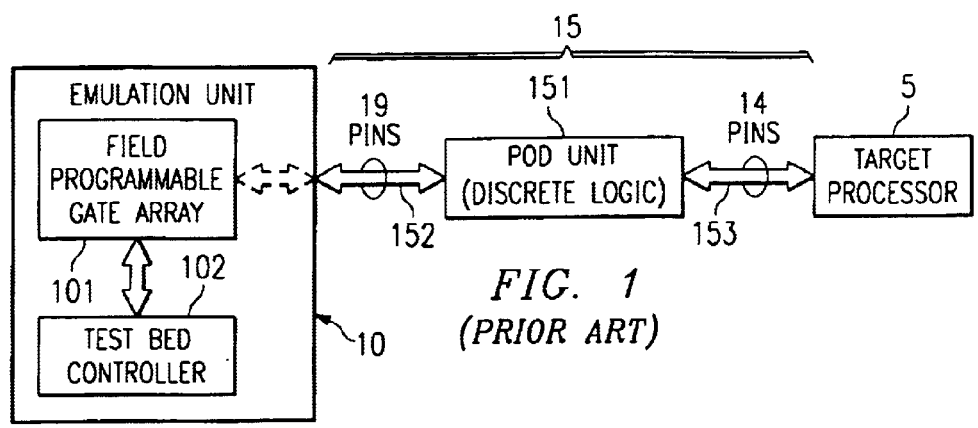
FIG. 1 is a test configuration for testing a target processor with the JTAG protocol according to the prior art.

FIG. 1 has been described with respect to the related art.

Figure 2:
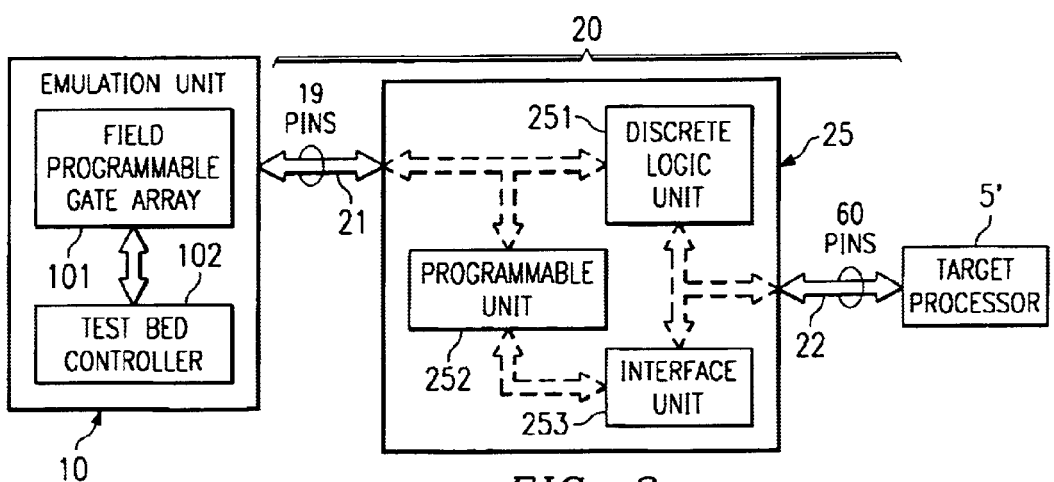
FIG. 2 is test configuration for testing a target processor with the JTAG test protocol and for testing the target processor using trace techniques according to a first embodiment of the present invention.

Referring to FIG. 2, the test configuration of the present invention is shown. The emulation unit 10 includes the field programmable gate array 101 and the test bed controller as before. The cable/pod unit 20 includes a first cable portion 21, a pod 25 and a second cable portion 22. The first cable portion 21 has a 19-pin connector for coupling to the emulation unit 10, the emulation unit 10 having the same mating connector as in FIG. 1. The second cable portion 22 is coupled to the target processor 5'. The second cable portion 22 has a 60-pin connector for coupling the pod 25 to the target processor 5'. The increased number of conductors in the second cable portion 22 provides the capacity to transmit trace signals. The pod includes a discrete logic unit 251, a programmable unit 252, and an interface unit 253.

Figure 3:
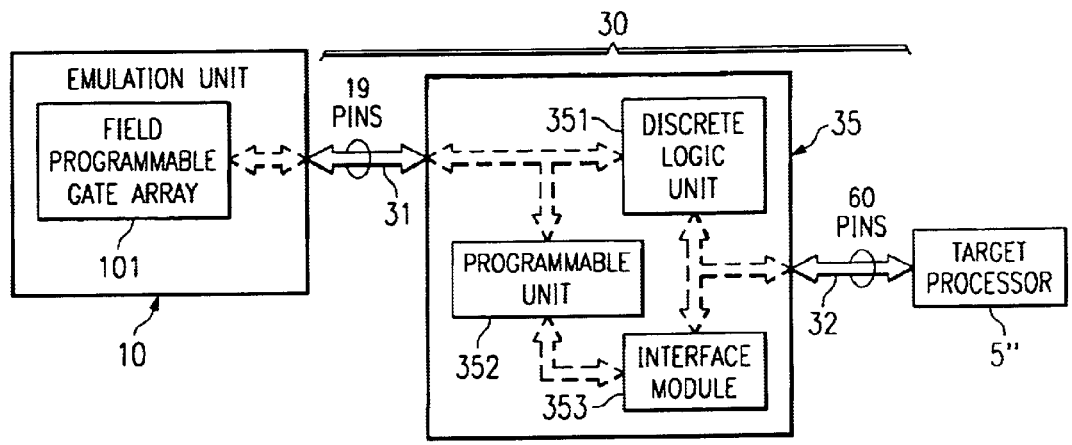
FIG. 3 is a test configuration for testing a target processor using trace techniques according to a second embodiment of the present invention.

Referring to FIG. 3, a test configuration for testing target processor 5" using trace techniques and remote JTAG and emulation control is shown. The emulation unit 10 has a field programmable gate array 101. In the operation of this embodiment, the test bed controller of the emulator unit shown in FIG. 2 is not used. The functions of the test bed controller are performed by the programmable unit 352 in the pod unit 35. The cable pod unit 30 comprises a first cable portion 31 coupling emulator unit 10 with a pod unit 35, and a second cable portion 32 coupling the pod 35 to the target processor 5". The first cable portion 31 has 19 conductors, while the second cable portion 32 has 60 conductors, as in the embodiment shown in FIG. 2. The pod includes a discrete logic unit 351, a field programmable gate array 352, and a trace module 353. The programmable unit 352 in pod unit 35 provides the mechanism by which the test system of FIG. 2 is reconfigured to the test system of FIG. 3. The present embodiment does not require any JTAG or emulation control signals, these signals being generated by the programmable unit 252. Consequently, the conductors that had been used for the JTAG protocols can be used for trace data transfer. The large amount of trace data can therefore be used transferred more rapidly because of the added conductor availability.

Figure 4:
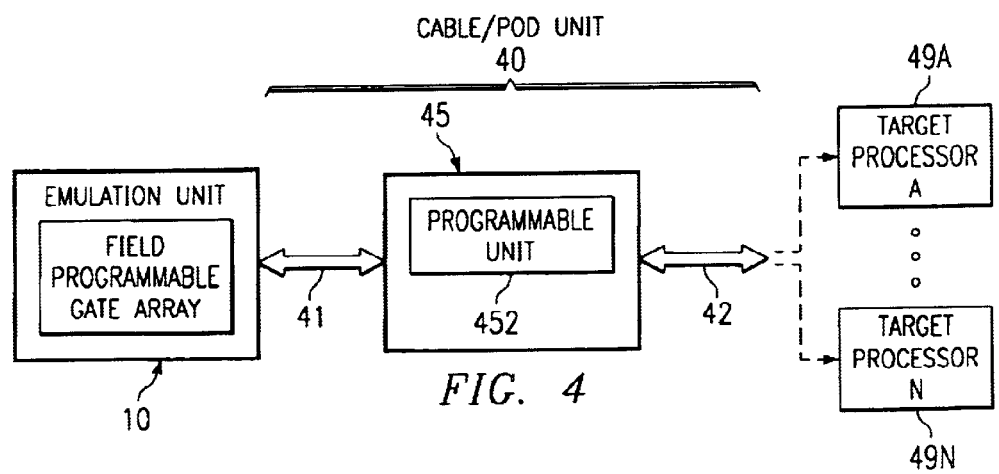
FIG. 4 illustrates an application of the reconfigurable cable/pod unit for testing different types of target processors.

Referring to FIG. 4, an application of the reconfigurable cable/pod unit 40 is shown. The problem that is addressed is the testing of different processing units and/or different digital signal processor units. The different processing units are target processors 49A through 49N. Each target processing unit 49A through 49N has a connector that permits the second cable portion 42 of the cable/pod unit 40 to be coupled thereto. When the cable/pod unit 40 is coupled to a target processor, for example processor 49A. The emulation unit 10 then programs the programmable unit 452 so that the cable conductor assignments and the responses thereto are compatible with the identity of the processor 49A. Thus, by simply reprogramming the programmable unit 452, the emulation unit 10 can be used to test a multiplicity of target processors.

2. Operation of the Preferred Embodiment

The operation of the first embodiment of the present invention can be understood as follows. Five conducting paths are dedicated to the JTAG procedures and six conductors are dedicated to emulation control. The cable portion coupled to the emulation unit has 19 conductors in the original cable/pod unit. In the original test configuration, eleven conductors where dedicated to JTAG signals and emulation control, the remainder to pod timing and control functions. In the new cable/pod unit, the eleven conductors are still dedicated to JTAG test procedures. However, the remaining conductors are now devoted to trace data transfer and to pod timing and control functions. The reconfiguration of the cable portion connecting pod and the target processor facilitate the transfer of the large amount of trace data generated by the target processor unit. Because of the desire to retain the original emulation unit, the trace data must be stored in the pod unit (i.e., the interface unit), reformatted and transmitted to emulation unit in a form appropriate for receipt by the emulation unit, that is, the trace packets and the timing must be altered. The commands are generated in the test control unit and applied to the field programmable gate array for transmission over the appropriate conductors. The field programmable gate array in the pod unit permits flexibility in applying the commands to the appropriate terminal of the target processor.

In the second embodiment of the present invention, the operation is similar to that of the first embodiment. The principal exception is that, because the cable/pod unit no longer gets JTAG signals from the emulation unit, the cable conductors reserved for this function and the associated logic components are no longer necessary. This larger group of conducting paths permits the trace data to be transferred at a higher rate.

The first and second embodiments described in FIG. 2 and FIG. 3 provide a reconfigurable interface between the emulation unit and the target processor. In this example, the reconfiguration provides for reassignment of signals on the conductors. However, the present invention is not so limited. For example, the presence of the programmable component in the pod unit permits the user to program the cable/pod unit to act as a serial interface or a parallel interface. Examples of popular interfaces that can be implemented by the present invention are the universal serial bus (USB), the small computer interface (SCSI), the firewire interface, the General Purpose Interface Bus (GPIB), etc. The presence of the programmable element permits the pod unit to reassign the conductors. The programmable element controls the signals received and transmitted by the pod unit.

As will be clear from the foregoing discussion, the prior art cable/pod unit and the two cable/pod units described herein can all be used in the same emulation unit. The programmable unit described with respect to the pod unit in FIG. 2, FIG. 3, and FIG. 4 can be implemented by a field programmable gate array. The programmable unit is adapted to be programmed by signals from the emulation unit.

One important advantage of the reconfigurable cable/pod unit is that by simply reprogramming the programmable unit in the cable/pod unit, updated and novel test procedures can be accommodated without providing a redesigned cable/pod unit. The feature reduces the cycle time to get the updated and novel test procedures into actual usage.

While the invention has been described with respect to the embodiments set forth above, the invention is not necessarily limited to these embodiments. Accordingly, other embodiments, variations, and improvements not described herein are not necessarily excluded from the scope of the invention, the scope of the invention being defined by the following claims.

What is claimed is:

1. A reconfigurable cable/pod unit for coupling an emulation unit with a target processor, the cable/pod unit comprising:

a first cable portion for coupling to the emulation unit;

a second cable portion for coupling to the target processor unit; and a pod unit coupled to the first cable portion and the second cable portion, the pod unit including:

a programmable unit, the programmable unit responsive to program signals from the emulation unit, the program signals programming the programmable unit, the programmable unit assigning functionality to the conductors of the first and second cable portions in response to the program signals;

a discrete logic unit responsive to the programmable unit for receiving timing and control signals from the first and second cable portions, the discrete logic unit applying logic and control signals to the first and second cable portions; and an interface unit responsive to the programmable unit for receiving and retransmitting data.

2. The cable/pod unit as recited in claim 1 wherein the first cable portion is designed to couple to a pre-existing cable.

3. The cable/pod unit as recited in claim 1 wherein the programmable unit is a field programmable gate array.

4. The cable/pod unit as recited in claim 1 wherein in a first programmed mode, the cable/pod unit exchanges only JTAG protocol and related signals between the emulation unit and the target processor.

5. The cable pod unit as recited in claim 1 wherein the cable/pod unit exchanges JTAG protocol, trace, and related signals simultaneously between the emulation unit and the target processor.

6. The cable/pod unit as recited in claim 1 wherein the cable pod unit exchanges only trace and related signals between the emulation unit and the target processor.

7. The cable/pod unit as recited in claim 1 wherein the programmable unit can be programmed by the program signals to provide a preselected interface to the target processor.

8. The cable/pod unit as recited in claim 1 wherein the programmable unit can be programmed by the program signals to provide an interface to a preselected target processor.

9. A method for providing reconfigurability for a cable/pod unit, the cable/pod unit coupled to a preexisting emulation unit by a first cable portion, the cable/pod unit coupled to a target processor unit by a second cable portion, the pod unit of the preexisting cable/pod unit having a discrete logic unit, the first and the second cable portions having a first and a second plurality of conductors respectively the method comprising:
to the preexisting pod unit of the cable/pod unit, adding a programmable unit, the programmable unit assigning the functionality to the first and second plurality of conductors;
to the preexisting pod unit adding an interface unit responsive to the programmable unit, the interface unit providing an interface between the emulation unit and the target processor unit, and
programming the programmable unit by the emulation unit.

10. The method as recited in claim 9 wherein the discrete logic unit provides an interface for timing and control signals between the emulation unit and the target processor unit.

11. The method as recited in claim 9 further comprising the step of programming the target processor unit to select only one mode between modes of operation consisting of 1.) exchanging only JTAG signals between the emulation unit and the target processor, 2.) exchanging only trace signals between the emulation unit and the target processor, and 3.) simultaneously exchanging JTAG and trace signals between the emulation unit and the target processor unit.

12. The method as recited in claim 9 further comprising the step of programming the programmable unit to provide a preselected interface with the target processor unit.

13. The method as recited in claim 9 further comprising the step of
programming the programmable unit to exchange signals with a plurality of predetermined target processor units.

14. A system for testing a target processor, the system comprising:
a preexisting emulation unit; and
a cable/pod unit, the cable/pod unit including:
    a first cable portion coupled to the emulation unit;
    a second cable portion coupled to the target processor; and
    a pod unit coupled to the first cable portion and the second cable portion, the pod having:
        a programmable unit, the programmable unit assigning the functionality of each of the conductors of the first and second cable portion;
        an interface unit responsive to the programmable unit for providing an interface to the exchange of data between the first and second cable portions; and
        a logic unit responsive to the programmable unit, the logic unit providing an interface between selected conductors of the first and second cable portions;
    wherein the programmable unit is programmed by the emulation unit.

15. The system as recited in claim 14 wherein the cable/pod unit has a first mode of operation for exchanging JTAG and related signals between the emulation unit and the target processor, the cable pod unit having a second mode of operation for exchanging trace and related signals between the emulation unit and the target processor, and the cable pod unit having a third mode of operation for simultaneously exchanging JTAG, trace and related signals between the emulation unit and the target processor.

16. The system as recited in claim 14 wherein the cable/pod unit can provide a selectable interface to the target processor, the interface determined by the programming of the programmable unit.

17. The system as recited in claim 14 wherein the cable/pod unit can be programmed for interact with any of a predetermined plurality of target processors, the interaction with a particular target processor determined by a program in the programmable unit.

* * * * *